United States Patent [19]

Dupont

[11] Patent Number: 5,535,207
[45] Date of Patent: Jul. 9, 1996

[54] METHOD OF DYNAMICALLY ALLOCATING TIME SLOTS ON A PACKET DATA COMMUNICATIONS CHANNEL

[75] Inventor: Pierre Dupont, Whistler, Canada

[73] Assignee: Motorola, Inc., Schaumburg, Ill.

[21] Appl. No.: 247,163

[22] Filed: May 20, 1994

[51] Int. Cl.$^6$ ....................................... H04J 3/16
[52] U.S. Cl. ..................... 370/80; 370/95.1; 370/110.1; 455/34.1; 455/38.3; 455/54.1
[58] Field of Search ................... 370/95.1, 95.2, 370/95.3, 85.2, 110.1, 85.3, 85.7, 17, 77, 80, 85.6; 455/343, 38.3, 53.1, 54.1, 13.4, 34.1; 340/825.03, 825.5, 825.51; 375/58, 63

[56] References Cited

U.S. PATENT DOCUMENTS

| | | | |
|---|---|---|---|
| 4,987,571 | 1/1991 | Haymond et al. | 370/85.3 |
| 5,020,056 | 5/1991 | Chennakeshu | 370/95.3 |
| 5,134,615 | 7/1992 | Freeburg et al. | 370/95.3 |
| 5,142,533 | 8/1992 | Crisler et al. | 370/85.2 |
| 5,175,870 | 12/1992 | Mabey et al. | 370/95.3 |
| 5,239,545 | 8/1993 | Buchholz | 370/95.1 |
| 5,241,542 | 8/1993 | Natarajan et al. | 455/347 |

*Primary Examiner*—Alpus H. Hsu
*Assistant Examiner*—Ricky Q. Ngo
*Attorney, Agent, or Firm*—Charles W. Bethards; Kevin A. Buford

[57] ABSTRACT

A method of dynamically allocating active time slots for a terminal (103) that is operating in a packet data communications system (100) which includes a fixed network (101) and user terminals (103), the system using a channel organized into time slots for scheduling data communications between the network and the user terminals, the method including first communicating information, further including a terminal ID and a packet key, representative of an active time slot pattern for the user terminal to the network; and second entering, at the user terminal, an active mode during each active time slot of the active time slot pattern.

16 Claims, 4 Drawing Sheets

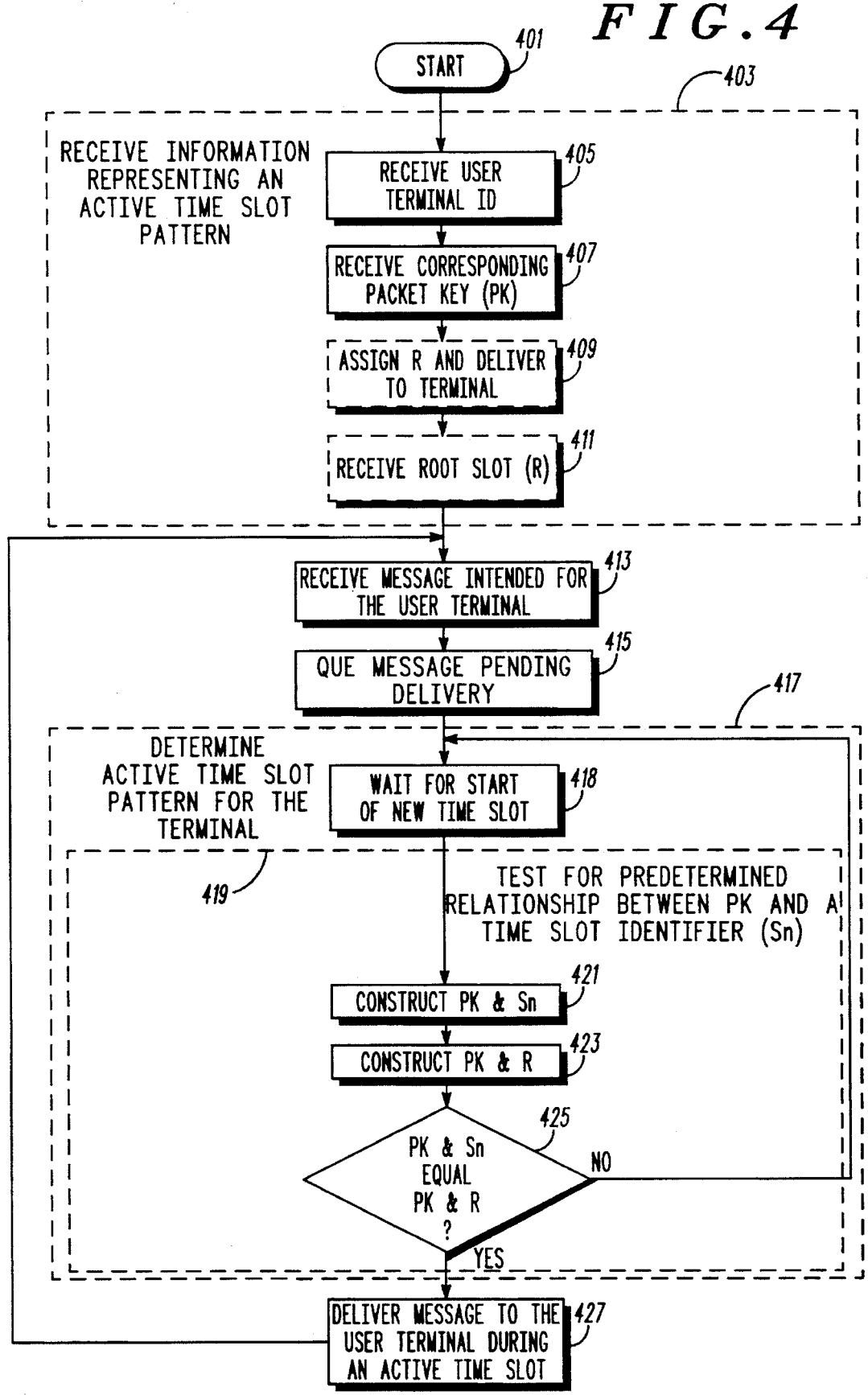

METHOD OF DYNAMICALLY ALLOCATING TIME SLOTS ON A PACKET DATA COMMUNICATIONS CHANNEL

FIELD OF THE INVENTION

The instant disclosure concerns packet data communications and more specifically but not limited to dynamically allocating time slots on a packet data communications channel.

BACKGROUND OF THE INVENTION

In a packet data communications system data messages are communicated or transmitted between, usually a small number of fixed sites or base stations included as part of a fixed network and, typically, a much larger number of portable or mobile user terminals located at various and changing geographic locations. Data communications in total occurs on one or a small number of radio frequency channels that collectively provide service to all terminals. Any particular base station transmitter operates on one radio frequency channel characterized by a band of radio frequencies. Usually a base station transmitter may rely on all portable or mobile terminals operating on that channel to be in an active state awaiting the delivery of a data message. However at any particular point in time the transmitter is limited to transmitting one data message to, ordinarily, one data terminal.

Given this property, communications systems and packet data communications systems in particular have chosen to organize available time on a channel into a plurality of time slots where a finite consecutive sequence of time slots is collectively referred to as a frame and frames follow each other in continuous succession. Data messages are delivered in data packets and one or more data packets may be included in each time slot or a data packet may overlap a time slot boundary. Given this organization of the available time on the channel and one or another known mechanism or protocol for maintaining time slot synchronization between the terminals and the base stations, terminals may be assigned either an active or inactive status for each time slot. The base station transmitters, specifically the communications system, only attempts to deliver or transmit messages to a particular terminal during an active time slot for that terminal. Terminals may then rely on these circumstances to, for example, advantageously conserve power or battery life by entering a power conservation mode during inactive time slots.

Paging communications systems have utilized various such time slot schemes to facilitate power conservation. One approach includes assigning each paging terminal a pre-defined time slot identity or pattern, such as active every fourth or eighth slot, that is invariant for the life of that pager or at least that paging identifier number (ID). Another approach used in paging and some prior art packet data systems includes providing within the header of some data communications packets a list of those terminal IDs corresponding to the terminals that the system expects to deliver data packets to during a particular time slot. Some systems have contemplated the use of a hybrid or combined version of the above two approaches.

Both approaches may provide potential power savings however either approach suffers from a form of inflexibility, when viewed from the perspective of the terminal. To appreciate this some further observations need to be explained. Any time slot approach will usually increase a system parameter referred to as average message delivery latency. Average message delivery latency is a measurement of the time delay incurred in delivery of the message from a source to the intended terminal and this parameter together with potential power savings increases in proportion to the percentage of the time that the terminal is inactive. In short increased power savings or battery life is obtained at the cost of increased message latency, at least up to a point determined by the average frequency of message activity for a particular terminal.

In any event in a time slot approach that assigns an invariant activity pattern to a terminal, regardless of the likely activity of that terminal, an opportunity for power savings may be lost or alternatively an undue average message delivery latency may be experienced. Similarly in the time slot allocation approaches that provide a list of IDs, all terminals must be active during each time period when IDs are communicated regardless of the likelihood that there ID may be listed. This again may represent a lost opportunity to save power. A need exists for a method of dynamically allocating time slots on a packet data communications channel.

In a packet data communications system including a fixed network and user terminals, the system using a channel organized into time slots for scheduling data communications between the network and the user terminals, a method of dynamically allocating active time slots for a terminal includes communicating, from the user terminal, information representative of an active time slot pattern for the user terminal to the network and entering, at the user terminal, an active mode during each active time slot of the active time slot pattern.

Alternatively in a similar setting a method of dynamically scheduling message delivery to a user terminal includes receiving information representative of an active time slot pattern from the user terminal, queuing a message intended for delivery to the user terminal, determining, dependent on the information, the active time slot pattern for the user terminal, and delivering the message to the user terminal during an active time slot of the active time slot pattern.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 4 is a flow chart in accordance with an alternative method embodiment of the instant invention.

DETAILED DESCRIPTION OF A PREFERRED EMBODIMENT

Figure 1:
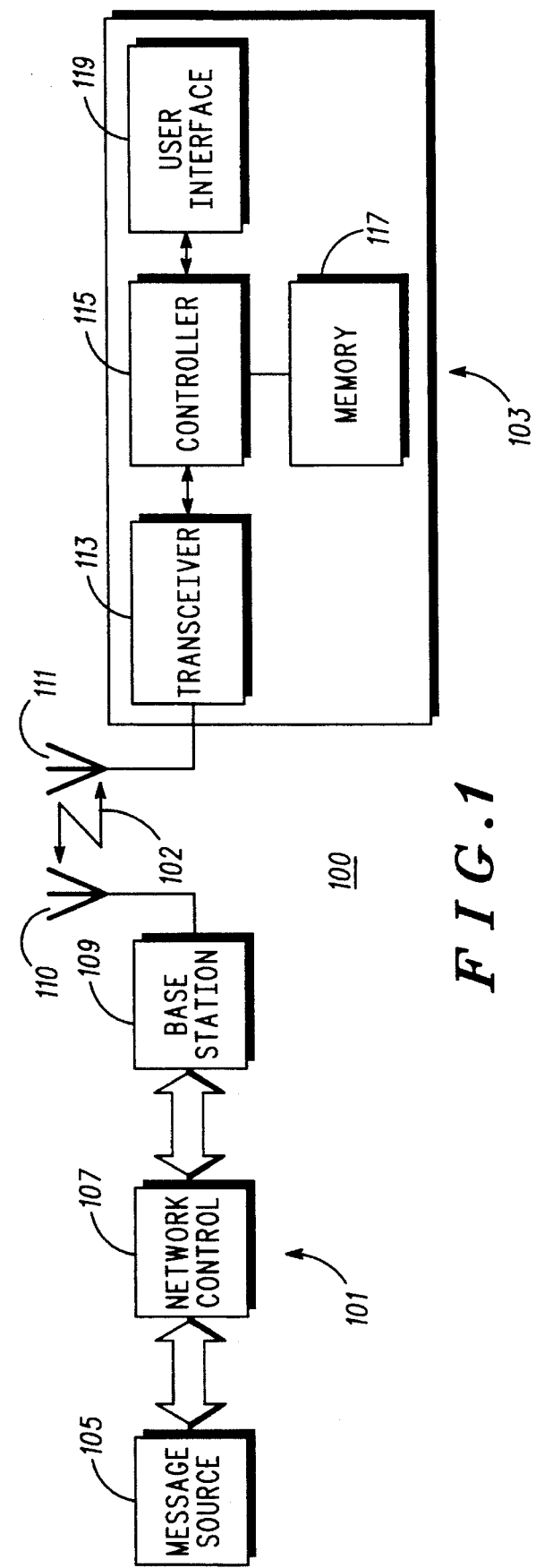
FIG. 1 is a block diagram of a wireless communications system suitable for employing an embodiment of the instant invention.

Generally the instant invention concerns a packet data communications system including a fixed network and user terminals. The system uses a channel, preferably a wireless channel, that is organized into time slots for scheduling data communications between the network and the user terminals. One preferred embodiment of the instant invention is a method of dynamically allocating active time slots for a terminal that includes the steps of communicating information representative of an active time slot pattern for the user terminal to the network and entering, at the user terminal, an active mode during each active time slot of the active time slot pattern.

In more detail this embodiment further includes the step of selecting the information at the user terminal and the information may include a pattern key. Selecting the pattern key may include selecting or choosing an activity level, such as 100%, 50% 25%, etc. or choosing a latency or maximum delay period equivalent to the number of sequentially inactive time slots for the terminal. Part of the entering step includes testing for a predetermined relationship, between the pattern key and a time slot identifier to determine when a time slot is active. The step of testing further includes constructing a first logical combination of the pattern key and the time slot identifier, constructing a second logical combination of the pattern key and a root slot, and comparing the first logical combination to the second logical combination, preferably for an equality, to decide when the predetermined relationship exists. The root slot corresponds to the terminal and may be communicated to the network as part of the information or alternatively may be assigned to the terminal by the network.

A related but alternative embodiment of the instant invention in a similar environment is a method of dynamically scheduling message delivery to a user terminal from the network that includes receiving information representative of an active time slot pattern from the terminal, queuing a message intended for delivery to the terminal, determining, dependent on the information, the active time slot pattern for the terminal, and delivering the message to the terminal during an active time slot of the active time slot pattern.

In more detail, receiving the information includes receiving a pattern key and the determining operation includes testing for a predetermined relationship between the pattern key and a time slot identifier to decide when a time slot is active. The testing activity further includes constructing a first logical combination of the pattern key and the time slot identifier, constructing a second logical combination of the pattern key and a root slot that corresponds to the terminal, and comparing, preferably for an equality, the first logical combination to the second logical combination to decide when the predetermined relationship exists. The root slot may be received from the terminal as part of the information or it may be assigned and communicated to the terminal by the network.

Referring to the figures for a more detailed description, FIG. 1 is a block diagram of a wireless communications system (100), such as a packet data communications system, suitable for employing an embodiment of the instant invention. The system (100) includes a fixed network (101) using a channel (102) to communicate with a user terminal (103). The fixed network (101) includes a message source (105), such as the public switched telephone network or a data network, coupled to a network controller (107). Generally various data messages, including those intended for or originating with the user terminal (103) are exchanged between the message source (105) and the network controller (107).

The network controller (107) is coupled to a base station (109) that includes an antenna (110). The network controller (107) exchanges data messages with the base station (109) and provides various other functions such as message routing, scheduling, network control, and billing. The antenna (110) couples the base station to the channel (102) for purposes of transmitting or receiving data messages and control information to or from the user terminal. It should be understood that FIG. 1 is a simplified block diagram and that actual systems will likely include a plurality of base stations and user terminals. In actual systems the routing and scheduling. activities may consume extensive amounts of the controller resources. Furthermore, the network controller, while depicted as a wholly separate entity, may be collocated with one or more base stations or may be distributed, functionally, among the base stations or some combination of either approach.

The user terminal (103) is coupled to the channel (102) by an antenna (111). More specifically by way of background and as well known the terminal (103) includes a transceiver (113) coupled to the antenna (111) and to a controller (115). The transceiver (113) modulates or demodulates binary data patterns onto or from a carrier signal such as a radio signal for a wireless channel. The binary data patterns are supplied by the controller (115) for modulation purposes or alternatively, subsequent to demodulation, supplied as a binary data stream to the controller (115) for further interpretation. The controller (115) likely further interprets this binary data stream, resulting from demodulation, as a structured data stream or channel typically including various bit patterns devoted to channel overhead activities, such as timing, synchronization and framing functions. Data units, representing the payload or actual information to be transported over the channel, are extracted from the framing structures and may be stored in a memory (117). The controller is further coupled to a user interface (119), such as a display device used to display the data units or messages, as in a paging device or a handheld computing device. Alternatively, the user interface for the user terminal may relay data messages to an accessory device such as a laptop or portable computer. The controller (115) ordinarily arbitrates the transfer of messages between the user interface (119), the memory (117) and the transceiver (113) units. An example of one such user terminal is the Motorola InfoTAC Personal Data Communicator, whose functional blocks are described in FIG. 4.6 of the Motorola Technical Manual document number 68P02929C60-0 (first edition, 1993).

The channel (102) is commonly organized so as to support duplex capability. For a wireless channel two separate frequency bands may be used and these are referred to as a forward and a reverse channel. The forward channel carries transmissions from the fixed network (101) to the user terminal (103), while the reverse channel carries transmissions from the user terminal (103) to the fixed network (101). A simple forward data channel may rely on the presumption that the user terminal (103) can continuously receive transmission signals from the base station (109). This allows the base station to transmit, at will, a data unit or message to any user terminal at any time. For various reasons including the facilitation of user terminal battery or power conservation, the forward radio channel may be divided into time slots. Under these circumstances a given user terminal may be expected to receive transmissions only in certain time slots referred to as active slots or active time slots.

Figure 2:
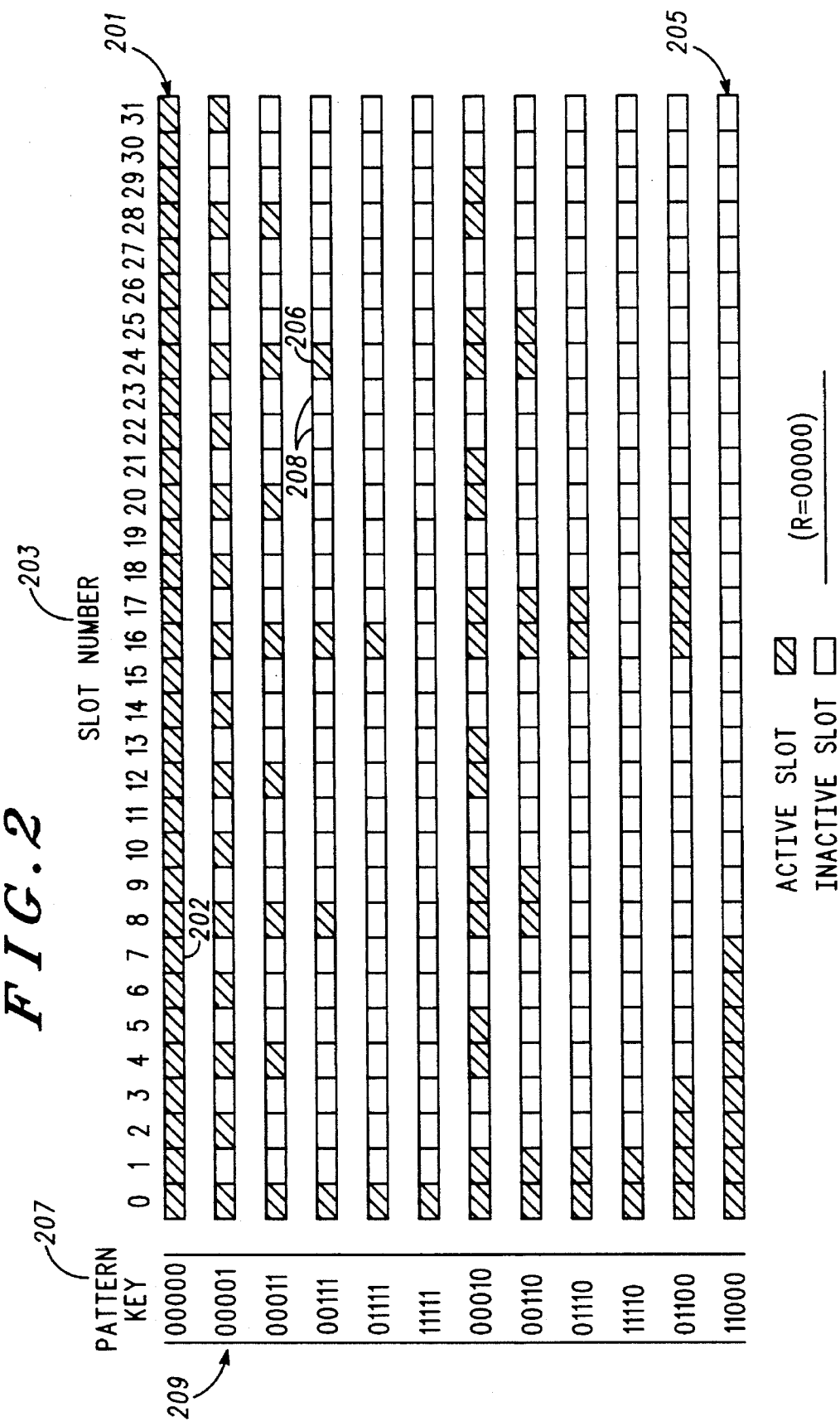
FIG. 2 depicts various time slot arrangements for a channel using an embodiment of the instant invention.

Referring to FIG. 2, the channel (102) and more specifically the contemplated time or time slot organization for the channel (102) will be discussed. A forward channel may be partitioned into a series of time slots (201) of equal duration. Each time slot ($S_n$) may be identified by a slot number (203)

related to its position within the sequence, for example the time slots are numbered 0 to 31 in FIG. 2 and therefore slot (202) would be designated $S_7$. A contiguous set of unique time slot numbers may be referred to collectively as a channel frame (205), which in FIG. 2 consists of 32 consecutive slots. The reader is cautioned not to confuse this channel frame, devoted to time organization of channel capacity or delivery scheduling, with a more common frame or data frame devoted to data transport management. In any event the forward radio channel is comprised of continuously repeating channel frames. Within a channel frame, a user terminal may be able to receive transmissions in one or more slots, each such slot denoted as an active slot. An active slot (206) is a time slot during which the base station may transmit a message to a particular user terminal provided that user terminal has an active time slot pattern that includes active slot (206) since the user terminal is expecting to receive transmissions. An inactive slot (208) is a time slot during which a user terminal is not expecting to receive transmissions.

Each user terminal has an active time slot pattern, distinctly defined by a pattern key (PK) (207), that includes the particular combination or sequence of active and inactive time slots which collectively comprise a channel frame. The active time slot pattern may include as few as one active slot per channel frame or alternatively all slots in the channel frame may be active. FIG. 2 depicts, by way of example, a sampling of twelve different time slot patterns which may be selected or chosen by or at the user terminal (103) by, in turn, selecting the corresponding pattern key (PK) (207) and then using an algorithm described below. The user terminal's pattern key (PK) (207) may be used to determine that terminals distinctive active time slot pattern for the channel frame by using a simple distributive algorithm.

The algorithm compares two values, the first being a bitwise combination, preferably a logical "AND" operation performed on a bit by bit basis, of the pattern key (PK) and the current slot number $S_n$, the second being a bitwise combination of the PK and a root slot number (R). The root slot number (R), discussed further below, is a time slot number assigned or derived for each user terminal in a manner that pseudo randomly and uniformly or evenly distributes the user terminal population amongst all possible time slots. R may be thought of as an offset in the root slot designation or an offset in the frame boundaries from the corresponding user terminals perspective. The reader of minimal skill may verify this by substituting in FIG. 2 an R of 00001 for the R of 00000 used to generate that FIG. As one example using the substituted R, when PK equals 00001 (209), PK & R equals 00001 and PK & $S_n$ will equal 00001 only for odd $S_n$ (e.g. $S_n$=1.3.5.7. etc. expressed as a binary number). Thus an R of 00001 looks like an offset of 1 time slot in the frame boundaries that are depicted in FIG. 2.

Mathematically this may be expressed as: $S_n$ is inactive, unless PK & $S_n$=PK & R, then $S_n$ is active. In words, when the comparison results in equality, the current time slot is said to be an active time slot. When this comparison results in inequality, the current time slot is said to be an inactive time slot. In this manner, the user terminal or the fixed network may determine the active time slot pattern within the channel frame for the user terminal so long as PK and R are known. Furthermore R may be used by the fixed network to provide load distribution among all available time slots and PK may be used by the user terminal to optimize performance for that user terminal.

Figure 3:
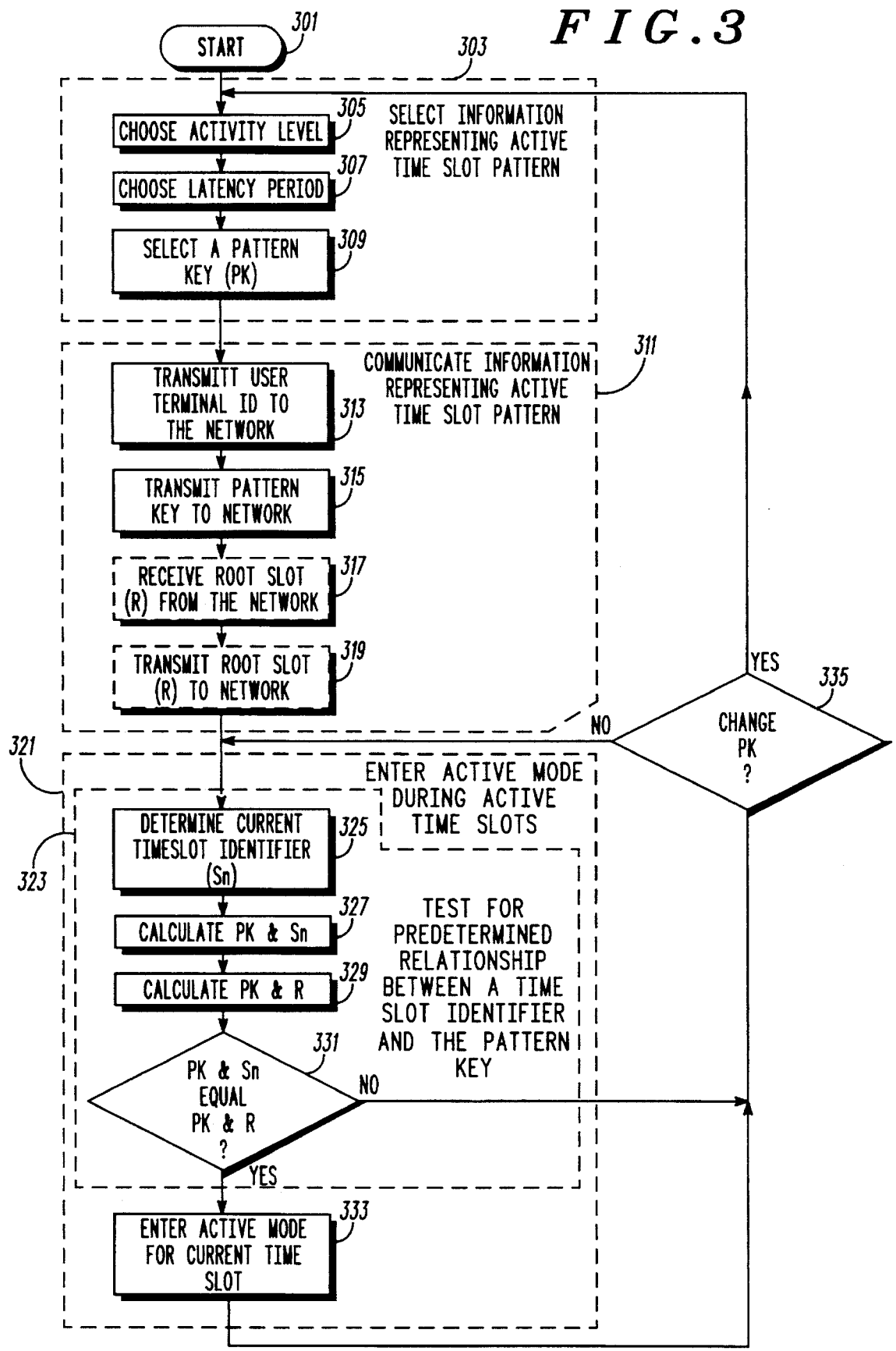
FIG. 3 is a flow chart in accordance with a preferred method embodiment of the instant invention.

Referring to the FIG. 3 flow chart, a method in accordance with a preferred embodiment of the instant invention will be described beginning at step (301). This method or process is implemented by software written to execute on a microprocessor (not specifically shown) such as a Motorola 68030 that is part of the controller (115). This embodiment of the instant invention is a method set in a packet data communications system that includes a fixed network and user terminals. The system uses a channel organized into time slots for scheduling data communications between the network and the user terminals and the method provides for dynamically allocating active time slots for a terminal as depicted by the FIG. 3 flow chart.

Initially at step 303 information representative of an active time slot pattern is selected. This ordinarily occurs at the user terminal (103) and includes at step (305) choosing or selecting an activity level corresponding to the desired ratio of active versus inactive time slots and then at step (307) choosing or selecting a latency period that will correspond to the maximum number of time slots or the total time period between active time slots. Finally at step (309), the user terminal selects an appropriate pattern key (PK) value which most nearly corresponds to the chosen activity level and latency period.

At step (311) the information representative of an active time slot pattern is communicated to the network, preferably by the user terminal. This will typically include the user terminal transmitting a unique identification designation (ID) and the above selected and corresponding PK to the network, respectively, at steps (313) and (315). In the preferred embodiment a method, typically referred to as a hashing function and known to the user terminal and the fixed network, is utilized by each to compute, based upon the user terminal's unique ID, a root slot (R) for the user terminal. This computation or hashing function is used to map a large range of values such as terminal IDs into a smaller set of values such as the range of slot numbers within a channel frame. By using a well known hashing function the user terminal and network are able to agree on a root slot number without the need to explicitly communicate the root slot number. A description and examples of hashing functions can be found in chapter 6 of the book by Donald E. Knuth entitled "The Art of Computer Programming, Volume 3: Sorting and Searching", published by Addison-Wesley, 1973.

Alternatively, at step (317), the network may, optionally, respond to the user terminal by transmitting an R that has been selected or assigned by the fixed network in some manner that evenly distributes the fixed network load across the user terminal population and among the available time slots within a channel frame. Certain advantages may accrue to this optional approach. These advantages include, for example, relatively greater flexibility on the part of the fixed network in the methodology used for assigning the root slots. This flexibility may allow assigning root slots on some preferential basis corresponding to a desired service or allow the fixed network to appropriately deal with different generations of user terminals. In any event at step 319, the user terminal may optionally acknowledge receipt of the root slot by, for example, transmitting this value back to the network.

Once the pattern key and root slot have been selected and communicated or otherwise established, the user terminal thereafter enters an active mode during each active time slot of the time slot pattern at step (321). This entering step further includes step (323) where testing occurs, specifically testing for a predetermined relationship between the PK and a time slot identifier ($S_n$) to determine whether a time slot is active. Testing for the relationship includes determining $S_n$ at step (325) and then calculating PK & $S_n$ and PK & R at, respectively, steps (327) and (329).

More specifically in the preferred embodiment step 325, is implemented by the user terminal monitoring the forward channel. The fixed network will identify the time slot number and channel frame boundary by periodically transmitting a synchronization pattern on the forward channel. Once the user terminal has received the synchronization pattern both the network and the terminal will have the same reference for the time slots within the channel frames. Calculating PK & $S_n$ in step 327, is a preferred approach for constructing a first logical combination of the pattern key (PK) and the time slot identifier (Sn). This logical combination is constructed by performing a bitwise (bit by bit) logical "AND" operation between PK and $S_n$. Similarly, in step 329, a second logical combination of PK and, this time, the root slot (R) is constructed by performing a bitwise logical "AND" operation between PK and R.

At step 331, comparing the first logical combination to the second logical combination is undertaken in order to decide when the predetermined relationship between PK and $S_n$ exists. If these two logical combinations are equal the predetermined relationship exists and the process proceeds to step 333. At step 33, the user terminal has determined that the current time slot is an active time slot and therefore it should remain active for the duration of the time slot to receive any data packets directed to this user terminal by the network. At the end of the active time slot, the user terminal proceeds to step 335. If these two logical combinations are not equal, at step 331 the process also proceeds to step 335.

At step 335, the user terminal determines whether PK is or should be changed. If the pattern key is unchanged, the user terminal returns to step 321 to await the next time slot. When the user terminal decides the pattern key is or should be changed for any reason, the user terminal returns to step 303 of the process chart. The PK may be changed based upon information transmitted by the network or information generated internally within the user terminal such as a desire to modify its activity level or latency period.

Referring to the FIG. 4 flow chart an alternative embodiment of the instant invention will be described in detail beginning with step 401. This method embodiment of the instant invention is similarly and preferably set in a packet data communications system that includes a fixed network and user terminals. The system uses a channel organized into time slots for scheduling data communications between the network and the user terminals. This embodiment provides a method of dynamically scheduling message delivery to a user terminal from the fixed network. This method would preferably be implemented within the network controller (107) and embodied in software that would be executed by a microprocessor based system (not specifically shown) therein.

At step (403), the network receives information, preferably from a user terminal, representing an active time slot pattern. More specifically, this includes receiving, preferably by a transmission from a user terminal, the terminal's unique identifier number (ID) and the user terminal's pattern key (PK), respectively, at step (405) and step (407). Steps (405) and (407) may occur concurrently as part of one transmission. Preferably, the network in accordance with the above discussion concerning hashing functions can determine the user terminals root slot (R) from the ID. Alternatively, at step (409), the network may, in response to the user terminals transmission, in turn assign and transmit a root slot (R), specifically a time slot number selected to evenly distribute the user terminal population amongst all time slots. At step (411), the user terminal may optionally acknowledge the R received at step (409) by transmitting this value to the network.

At step (413), the network receives a message, likely from the message source, but possibly internally generated, that is addressed to and intended for delivery to the user terminal. At step (415) the message intended for delivery to the user terminal is queued pending determination of an active time slot pattern for the terminal at step (417). At step (418), the network awaits the beginning of the next time slot before proceeding to step (419). Step (419) involves testing for a predetermined relationship between PK and the current time slot identifier (Sn) to decide whether the time slot is active.

This includes, at step (421), constructing a first logical combination of the user terminal pattern key and the time slot identifier by performing a bitwise logical "AND" operation between PK and $S_n$ and at step (423), constructing a second logical combination of the user terminal pattern key and the root slot by performing a bitwise logical "AND" operation between PK and R. Given these logical combinations, a comparison of the first logical combination and the second logical combination to determine when said predetermined relationship exists is performed, at step (425). If the logical combinations are equal then the method proceeds to step (427) where the queued message(s) from step (415) is delivered to the user terminal by the network. In step (427) the network has determined that the current time slot is an active time slot and therefore it may deliver the queued messages to the user terminal. Following delivery of one or more pending messages during the active time slot, the network returns to step 413 to await further delivery requests. If the logical combinations are not equal then the process loops back and repeats from step (418).

It will be appreciated by those of ordinary skill in the art that the apparatus and methods disclosed provide various methods for dynamically allocating time slots on a packet data communications channel. These inventive methods may be readily and advantageously employed in a packet data terminal or other communications device or system to optimize power conservation for a given message latency period on a terminal by terminal basis, without otherwise sacrificing network load distribution. Hence, the present invention, in furtherance of satisfying a long-felt need of data communications, and more specifically wireless data communications, facilitates portable data terminals by providing an exemplary method of optimizing power conservation on a terminal by terminal basis thus extending useful battery life for many terminals.

It will be apparent to those skilled in the art that the disclosed invention may be modified in numerous ways and may assume many embodiments other than the preferred form specifically set out and described above. For example while one pattern key family and its various properties have been discussed others clearly exist. Accordingly, it is intended by the appended claims to cover all modifications of the invention which fall within the true spirit and scope of the invention.

What is claimed is:

1. In a packet data communications system including a fixed network and user terminals, the system using a channel organized into time slots for scheduling data communications between the network and the user terminals, a method of dynamically allocating active time slots for a terminal including the steps of:

communicating, from the terminal, information identifying an active time slot pattern having a pattern key and a time slot identifier for the terminal to the network, the active time slot pattern defining a pattern of active time slots, during which the terminal is active to receive data being sent by the network to the terminal, and inactive time slots, during which the terminal is inactive so as not to receive data from the network; and entering, at the terminal, an active mode during each active time slot of said active time slot pattern.

2. The method of claim 1 further including the step of selecting said information at the terminal.

3. The method of claim 2 wherein said step of selecting said information further includes selecting said pattern key.

4. The method of claim 3 wherein said step of selecting said pattern key further includes choosing an activity level for the terminal.

5. The method of claim 4 wherein said step of selecting said pattern key further includes choosing a latency period for the terminal.

6. The method of claim 3 wherein said step of entering further includes testing for a predetermined relationship between said pattern key and said time slot identifier to determine whether a time slot is active.

7. The method of claim 6 wherein said step of testing further includes constructing a first logical combination of said pattern key and said time slot identifier, constructing a second logical combination of said pattern key and a root slot, and comparing said first logical combination to said second logical combination to decide when said predetermined relationship exists.

8. The method of claim 7 further including communicating said root slot to the network as part of said information.

9. The method of claim 8 wherein said step of selecting said pattern key further includes choosing an activity level for the terminal.

10. The method of claim 9 wherein said step of selecting said pattern key further includes choosing a latency period for the terminal.

11. In a packet data communications system including a fixed network and user terminals, the system using a channel organized into time slots for scheduling data communications between the network and the user terminals, a method of dynamically scheduling message delivery to a terminal including the steps of:

receiving information identifying an active time slot pattern having a pattern key and a time slot identifier from the terminal, the active time slot pattern defining a pattern of active time slots, during which the terminal is active to receive data being sent by the network to the terminal, and inactive time slots, during which the terminal is inactive so as not to receive data from the network;

queuing a message intended for delivery to the terminal;

determining, dependent on said information, said active time slot pattern for the terminal; and delivering said message to the terminal during an active time slot of said active time slot pattern.

12. The method of claim 11 wherein said step of receiving information further includes receiving said pattern key.

13. The method of claim 12 wherein said step of determining further includes testing for a predetermined relationship between said pattern key and said time slot identifier to decide when a time slot is active.

14. The method of claim 13 wherein said step of testing further includes the steps of constructing a first logical combination of said pattern key and said time slot identifier, constructing a second logical combination of said pattern key and a root slot that corresponds to the terminal, and comparing said first logical combination to said second logical combination to decide when said predetermined relationship exists.

15. The method of claim 14 further including receiving said root slot from the terminal as part of said information.

16. The method of claim 14 further including assigning said root slot to the terminal.

* * * * *